US012743939B2

(12) United States Patent
Hallett et al.

(10) Patent No.: US 12,743,939 B2
(45) Date of Patent: *Sep. 22, 2026

(54) PROACTIVE LOSS PREVENTION SYSTEM

(71) Applicant: INPIXON, Palo Alto, CA (US)

(72) Inventors: James Francis Hallett, Vancouver (CA); Kirk Arnold Moir, Vancouver (CA); Eddie Shek Cheung Ho, Vancouver (CA)

(73) Assignee: INPIXON, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,516

(22) Filed: Nov. 21, 2023

(65) Prior Publication Data

US 2024/0161592 A1 May 16, 2024

Related U.S. Application Data

(63) Continuation of application No. 14/556,034, filed on Nov. 28, 2014, now Pat. No. 11,875,657.

(60) Provisional application No. 61/974,976, filed on Apr. 3, 2014.

(51) Int. Cl.
*G08B 13/24* (2006.01)

(52) U.S. Cl.
CPC ....... *G08B 13/2482* (2013.01); *G08B 13/248* (2013.01)

(58) Field of Classification Search
CPC .......................... G08B 13/2482; G08B 13/248
See application file for complete search history.

(56) References Cited

U.S. PATENT DOCUMENTS

| | | | | |
|---|---|---|---|---|
| 8,768,315 B2 * | 7/2014 | Miller | H04W 12/80 455/414.1 |
| 11,875,657 B2 * | 1/2024 | Hallett | G08B 13/248 |
| 2011/0183688 A1 * | 7/2011 | Dietrich | H04W 64/00 455/456.1 |
| 2013/0229930 A1 * | 9/2013 | Akay | H04W 12/64 370/252 |

* cited by examiner

*Primary Examiner* — Steven Lim
*Assistant Examiner* — James E Munion
(74) *Attorney, Agent, or Firm* — Chrisman Gallo Tochtrop LLC

(57) ABSTRACT

A method and system for Proactive Loss Prevention (PLP) System in venue and retail using wireless-based technology. Physical security measures are the first line of defense for protecting assets in any venue and retail spaces. These systems (e.g. Electronic Article Surveillance systems) are widely deployed in retail spaces. However, retail theft is still estimated at a multibillion dollar level on an annual basis in the US alone. This invention augments existing physical security systems to enable a proactive approach for suspect identification and subsequent presence alerting using a wireless local area network (WLAN) based system.

19 Claims, 11 Drawing Sheets

External incident notification processing, VMS scenario

External incident notification processing

PROACTIVE LOSS PREVENTION SYSTEM

CROSS-REFERENCES TO RELATED APPLICATIONS

This application is a continuation of U.S. patent application Ser. No. 14/556,034, filed Nov. 28, 2014, which claims priority from Provisional U.S. patent application Ser. No. 61/974,976, filed Apr. 3, 2014, the disclosure of which is incorporated herein in its entirety by reference for all purposes.

BACKGROUND OF INVENTION

Field of Invention

This invention relates to systems and methods for proactive loss prevention (PLP).

Description of Related Art

This invention uses a similar method and procedure for proximity detection and recognition of WLAN and related enabled wireless mobile devices (herein, "mobile device") as described in pending U.S. application Ser. No. 14/104,417 (titled "Method and System for Wireless local area network Proximity Recognition") which is incorporated herein by reference in its entirety.

Both online and brick and mortar retail establishments struggle to prevent criminal activities such as payment information theft, fraud, and in-venue theft of merchandise. According to the National US based Retail Federation, organized retail crime (ORC) losses amount roughly $30 billion each year, and about 94% of all retailers experience it on some level.

Electronic Article Surveillance (EAS) system is widely deployed in retail spaces. It is an effective tool to reduce shoplifting and protect merchandize. However, due to various errors in the system, weekly false alarms in many larger retail venues is still common. To reduce customer embarrassment, some alarm conditions are not investigated thus adversely impacting the effectiveness of the EAS system. Further, current EAS systems cannot recognize repeat offenders.

Security personnel equipped with various video-based technologies is the standard approach to addressing venue security. Advances in video technology have increased overall effectiveness. Besides a widespread switch to higher definition (HD) camera technology, such advances include high performance facial recognition as well as related anomaly detection systems.

Video based approaches, particularly HD systems, tend to generate copious amounts of information. Because of the sheer volume of images produced, it is difficult for personnel to use in "real time" as criminal activity occurs. While real-time video analytics are becoming more common, typically, video is used after the fact to learn about the incident based on specific reports from department managers or to prove specific facts about an incident (which could range from a crime to suspicious circumstances). While reasonable, the downside of this approach is that the majority of incidents are not detected as they occur.

Alternatively, additional personnel can be deployed to monitor video in real time and/or security personnel can be sent to the venue. This removes or lessens the burden on remote, typically video based, analytics approaches and increases the percentage of incidents detected. But such an approach is very expensive both in terms of personnel and costs.

This invention's solution is to better use mobile wireless technology to enhance understanding of visitor interactions within a venue or group of venues. Leveraging the increasing commonality of smart phones, visitor presence at a venue is inferable by the detection of the visitor's Wi-Fi (or similar wireless technology) equipped mobile device, by sensors installed in the venue. When a criminal incident (for example, shoplifting) or suspicious activity is detected in real time (or deemed to be suspicious through later analysis of video, Wi-Fi-derived evidence, inventory statistics or other possible means), the visitors (and their mobile devices) known to be proximate the incident (time and distance), are noted for future use and analysis. As incidents occur over time at the venue, the visitors present at or proximate during those incidents are also noted. A visitor (and his/her mobile device) who fits a pattern that matches rules defined by the venue operator or other user using the present invention, is inferred as "suspicious" and his/her device is deemed as "suspicious" (i.e. deemed "Suspect Device"). Examples of incidents include: a) presence at the venue outside of prescribed business hours for more than a minute; b) presence for more than 30 minutes preceding an incident; c) presence at more than one incident. If a Suspect Device returns to the venue or related venue (e.g. another store of a chain), security personnel can be alerted through the video system, mobile alerts such as email, text message, and/or mobile application updates.

SUMMARY OF THE INVENTION

In the "real life" of a venue, "suspicious activities" happen. Video footage and other image capturing is cheaply and voluminously available but their very completeness makes difficult their analysis for investigating "suspicious activities". Video footage almost defies "data mining" thereof for suspicious activities and persons. Although face-recognition technologies have improved much recently, there is still no efficient way to meaningfully identify persons in the video footage who are "suspicious" because of their presence at or proximity to, for example, several scenes of "suspicious activities" in the venue. A human reviewer cannot efficiently and accurately recall and match faces from several scenes, especially if there are reams of video footage between two suspicious incidents.

The present invention can be thought as "overlaying" on the video footage of a venue, information of the visits of Wi-Fi enabled mobile devices to the venue. This information is the mobile device appearance histories, parameterized by the time(s) of detection(s) by mobile device detection infrastructure (in particular, proximity recognition detectors or devices (PRDs)) and by the locations (in the venue) of such infrastructure, and these histories are relatable to video footage scenes (by time(s) and location(s) of video footage scene(s). Such mobile device appearance histories are easily searchable by time and PRO location and lend themselves to Boolean, fuzzy logic and common operators. By transforming onto the domain of [time (granularized) and PRO (granularized)], the "suspicious devices" can be more easily identified, and then: (1) transforming back to the video footage domain, the appropriate images (from the vast video footage) can be easily retrieved and sent to security personnel; and (2) the return of suspicious devices, in the "real life" of the venue, can be monitored.

This invention provides a system and procedures to augment existing physical security systems to enable a proactive approach for suspect identification and subsequent presence alerting.

The present invention integrates in-venue mobile device proximity detection and recognition with incident/event management and a mobile device watch system to form a Proactive Loss Prevention (PLP) system.

The invention includes a method comprising the steps of proximity detection and recognition of mobile devices. Once a mobile device identifier (ID) is recognized (and thereby becomes a "Known Device"), it is stored with other related information (e.g. time stamp, associated proximity recognition device(s) (PRD(s)) in the PLP system for further analysis. In particular, information about each Known Device, such as its history of appearances in the venue ("venue appearance history") as detected by the PRDs, is obtained from the appropriate database of the proximity recognition infrastructure and/or stored elsewhere in the PLP system.

The invention includes a method for processing an incident notification from an external physical security system (or from a user) and then creating or defining an Event based on the user-defined rules and parameters.

Incidents are "suspicious activities" occurring in or near the venue. As described above, suspicious activities (that may be deemed an Incident) include examples such as: presence at the venue outside of prescribed business hours for more than a set duration; presence at the venue for more than 30 minutes preceding an incident; and presence at the venue at more than one incident; someone filling a bag (that may be shoplifting).

There are three basic categories of incidents. In the first category are those incidents that are not determined in real time, and instead are later determined and are not rule-based. A human reviewer of video footage (or any other information in any media) from which time and location can be provided, considers and deems (or not) whether an activity is suspicious (or not). For example, user reviews a video tape of the venue (whether that tape is connected with the present invention or is an independent, stand-alone system) and sees an unusual amount of loitering of an individual outside of regular business hours, or someone suspiciously filling a bag or similar, and notes time and venue location of the suspicious activity. It is an "after the fact" review of video tape or similar image captures (which may or may not be connected to PLP) or other information from any source (e.g. hearsay) that provides times and physical locations in the venue of suspicious activities. The above are examples of this first category.

The second type of Incident is suspicious activity that is automatically recognized as such by the operation of a conventional, external security-related system (such as External Systems 300). It is a "per se", real time determination. For example, a visitor (carrying a Known Device) walks out of the venue with a magnetized tagged, retail article without paying (i.e. the tag has not been demagnetized), will trigger an EAS 303 station alarm. Some of the above activities examples of the first category can also be examples of the second category. For example, a security motion detector may detect a visitor who is impermissibly present in a location in the venue. This second type of Incident is determined in real time and is rule based. A third type—a variant of these two types of Incidents (i.e. without a security-related external system but operating in real time and is rule-based) is the detection (by a PRO) of the re-appearance, in or near the venue, of a mobile device that had been earlier identified as a Suspect Device.

This invention normalizes an Incident (i.e. a suspicious activity in "real life" in or near the venue) into a corresponding Event. An Event is usable as part of the inference-making process that deems (or not) a Known Device to be a Suspect Device (or not) (i.e. whether the individual holder of that Known Device should be considered as connected to a suspicious activity).

The invention includes a method comprising the steps of creating a set of events (i.e. one or more events) based on the user-defined rules and user-inputted parameters, each motivated by, and corresponding to, a "suspicious incident". This method allows the PLP system (rule based and/or user-assisted) to determine a small intersection (typically one or two wireless devices, "Suspect Device(s)") from the venue appearance histories of the PRDs of the Events in the Event Set The invention includes a method comprising the steps of creating and maintaining a list of "suspicious" mobile devices based on the intersection from device list of the Event Set. This method allows the PLP system to keep watch for the return of identified wireless devices that are considered suspicious, on a near real-time basis, whether throughout the venue or restricted to proximity to user-selected PRDs.

The invention includes a method comprising the steps of examining protocol data units (PDUs) from any Known (wireless) Device. If a POU belongs to one of the wireless device under watch, i.e. a Suspect Device, the PLP system would carry out the defined action to alert the user and/or other external systems.

DETAILED DESCRIPTION OF THE INVENTION

Figure 1:
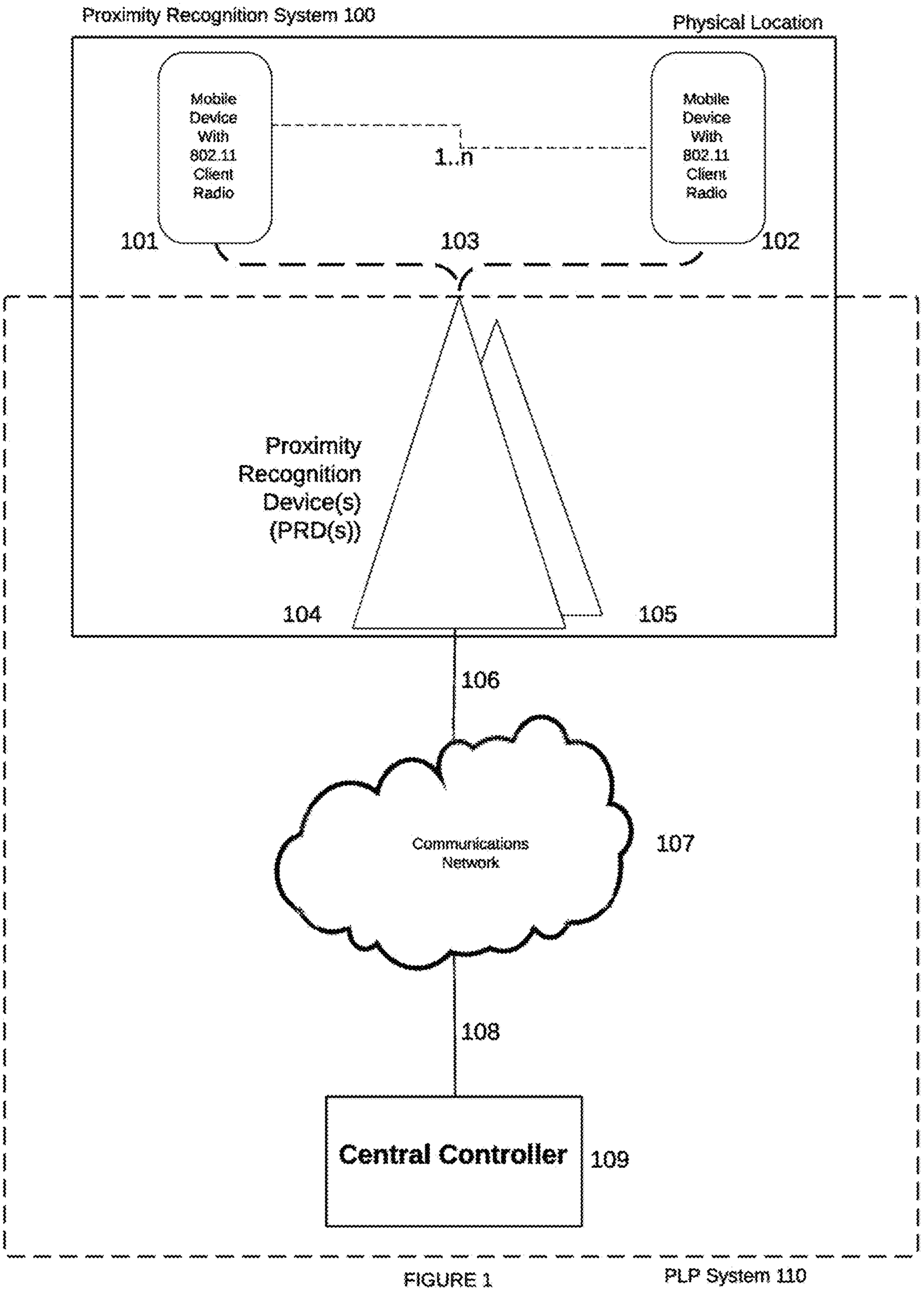
FIG. 1 is a functional block diagram of a proximity recognition system (PRS) with reference to pending application Ser. No. 14/104,417 (and whose entirety is incorporated herein by reference), and illustrates a system deployment sample.

The present invention is described in detail with regard to the drawing figures briefly described above.

The following terms are used with the following meanings. The terms “venue”, “premise”, “space”, “real estate”, and “real estate premise” unless otherwise specified below are used interchangeably to refer to a specific physical space owned and/or operated by a real estate provider. Venues include malls, stores, shops, and theatres as well as other types of spaces including hotels, motels, inns, airports, dock facilities, arenas, hospitals, schools, colleges, universities, libraries, galleries, stations, parks, and stadiums. In alternate embodiments of the invention, space may include roadways on which vehicles operate.

The terms “WiFi, “Wifi”, “WLAN”, “Wireless Fidelity”, and “wireless local area network” refer to communications between mobile devices and with infrastructure elements commonly referred to as “access points” (APs). WLAN refers to devices and infrastructure using some variant of the 802.11 protocol defined by the Institute of Electrical and Electronics Engineers (IEEE) or some future derivation. The mobile devices herein are enabled according to WLAN protocol.

The terms “visitor”, “guest, or “invitee” unless otherwise specified below, are used interchangeably to refer to any party that visits a venue which may or may not house merchants with whom a visitor could initiate a purchase of goods or services.

Referring to FIG. 1, the principal components of the present invention are illustrated in a block diagram. A system and method is provided for proximity detection, recognition and classification of a wireless local area network (WLAN) enabled mobile device without a WLAN infrastructure, incident/event management, or wireless device watch system. The proximity recognition system (PRS) monitors WLAN communications at one or more known locations depicted in FIG. 1 as 100. The proximity of mobile device 101 or plurality of mobile devices 101, 102, is sensed by examining signal strength at a proximity recognition device PRO 104, 105 when the device 101 initiates an association request for WLAN access. An identifier of the mobile device may be provided in the association request. Association requests may be periodic or may be prompted by a specific response from the WLAN PRO 104 which may operate on one or more WLAN channels. Association requests may be sensed by one or a plurality of PRDs 104, 105. Information received by the PRDs 104 is analyzed, summarized and sent via communications interface 106 including a combination of cable modems, DSL, OS1, OS3, SONET, Ethernet, fiber optic, WiMax, WiFi 802.11 or other wireless technology such as CDMA, GSM or long term evolution (LTE) or other future communications capability to a communications network 107 such as the Internet. Central Controller 109 of the Proactive Loss Prevention system PLP 110 is connected to the same communications network 107 via communications interface 108.

In FIG. 1, although only a single physical venue 100 is shown, the principles of this invention are applicable to multiple locations. All PRDs 104, 105 communicate with Central Controller 109 via communications interface 108 and communication network 107.

The present invention can be implemented in numerous ways, including as a process, a system, an apparatus, a device, a method, a computer readable storage medium containing computer program code, or as a computer program product comprising a computer usable medium having a computer readable program code embodied therein.

In the present context, a computer usable medium or computer readable medium may be any medium that can contain or store the program for use by or in connection with the instruction execution system, apparatus or device. For example, the computer readable storage medium or computer usable medium may be, but is not limited to, RAM, ROM or a persistent store, such as a mass storage device, hard drives, COROM, OVOROM, solid state drives, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hard coded in hardware or take the form of software executing on a general purpose computer such that when the software is loaded into and/or executed by the computer, the computer becomes an apparatus for practicing the invention, or they are available via a web service.

Applications may also be downloaded in whole or in part through the use various development tools which enable the creation, implementation of the present invention. In this specification, these implementations, or any other form that the invention may take, may be referred to as techniques. In general, the order of the steps of disclosed processes may be altered within the scope of the invention.

Figure 2:
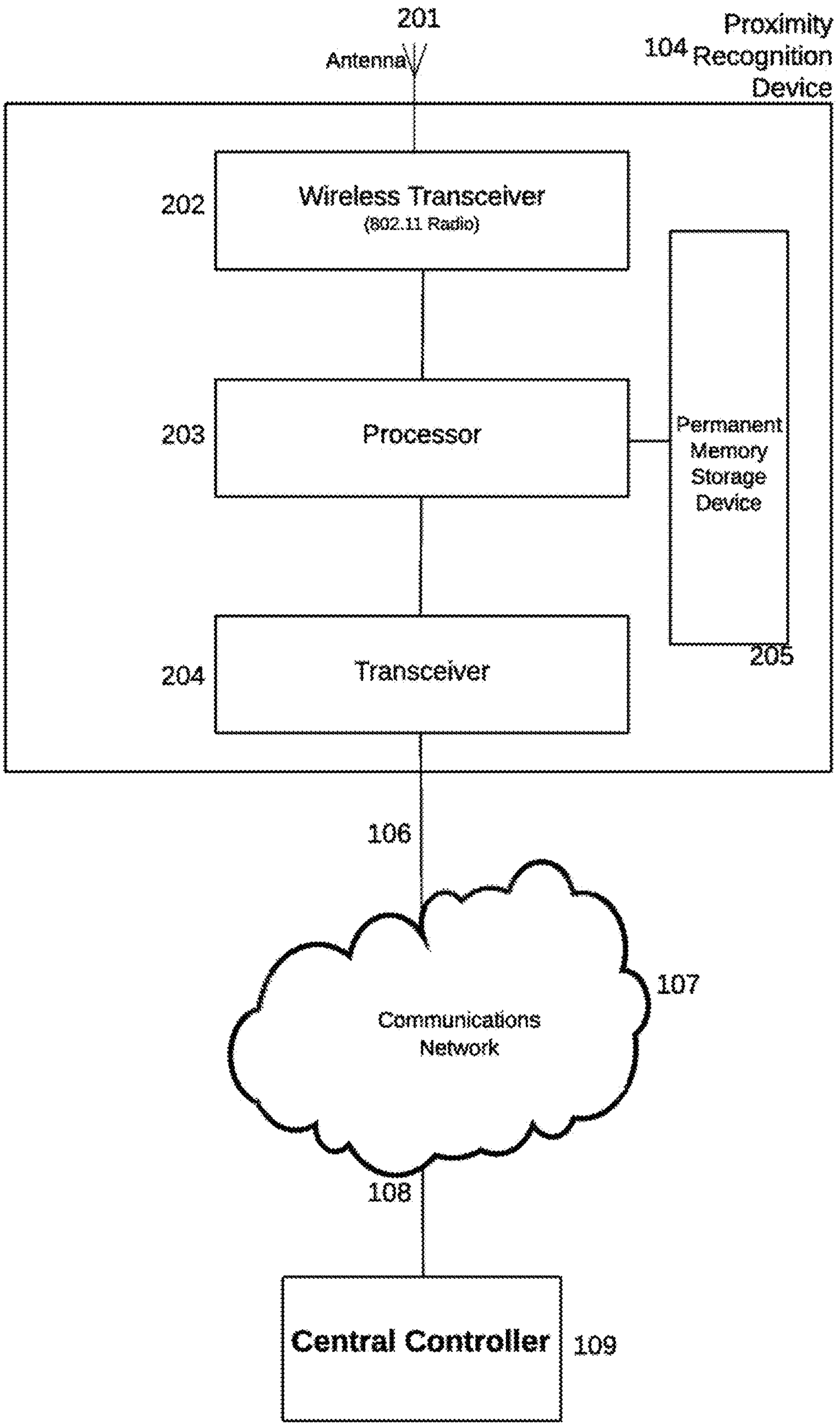
FIG. 2 is a functional block diagram of a proximity recognition device (PRO)

FIG. 2 shows a block diagram of a proximity recognition device PRO 104.

PRO 104 has one or more wireless antennas 201 for receiving signals from WLAN equipped mobile devices in its vicinity.

PRO 104 is equipped with WLAN capable transceiver 202 for sending and receiving packets to and from mobile devices in its vicinity.

PRO 104 is equipped with transceiver 204 for sending and receiving information to Central Controller 109. A variety of embodiments are possible. These include Ethernet, a separate WLAN radio, universal serial bus, or other wireless wide area wireless networking device technology such as CDMA, GSM or long term evolution (LTE). Transceiver 204 connects to a communications network 107 such as the Internet over a wired or wireless communications interface 106.

PRO 104 is equipped with permanent memory storage device 205 for storage of program instructions related to the operation of the PRS proximity recognition system. In various embodiments, this could include compact flash or similar memory devices.

PRO 104 processor 203 is configured to execute instructions stored in the permanent memory storage device 205.

PRO 104 provides detection and recognition of wireless local area network (WLAN) enabled mobile devices in range of the PRO 104 without a WLAN infrastructure. The ability to provide this capability is particularly important in venues that do not have or control WLAN infrastructure or do not wish to provide WLAN access for visitors for business reasons.

PRDs 104 monitors WLAN communications at its known locations in or near the venue, determining the identifier of mobile devices in range/proximity within the venue during the mobile device's attempts to associate with a WLAN access point.

Proximity recognition devices PRDs 104, 105 may optionally monitor multiple WLAN communications channels.

Based on a dynamically determined understanding of the WLAN infrastructure environment and WLAN infrastructure of interest to the mobile device, the proximity recognition device PRO 104 may prompt an association request from the mobile device by sending to the mobile device a specifically formatted response. To improve the mobile device location inference, more interactions are prompted by PRO 104. The prompted association request is preceded by management frames in the scanning and authentication phases of the association sequence.

Specifically, PRO 104 provides for detection of a WLAN association request received via antenna 201 and wireless transceiver 202, wherein the association request is associated with a request from an originating mobile device to gain access to a wireless local area network.

The proximity of a mobile device can be sensed by examining signal strength when the mobile device initiates a request for WLAN access or by any conventional recognition method. Conversely, the granularity of a PRO 104 can be adjusted by setting thresholds of received signal strength from mobile devices—if only devices whose received signal strengths are beyond a certain thresholds (i.e. ignoring those whose strengths are less), PRO 104 may be considered to cognizant of only nearby mobile devices. Similarly, the granularity of PRO 104 can be adjusted to be cognizant of further away devices.

A unique identifier of the mobile device (e.g. MAC address) may be provided in the association request. When provided, the unique identifier is provided to Central Controller 109 for further processing along with additional information such as PRO 104 identifier, physical location, the mobile device's association request's signal strength and timestamp. Central Controller 109 is coupled to the same communications network 107 as PRO 104 via communications interface 108.

In one embodiment, PRO 104 can also use permanent memory device 205 to temporarily record information regarding observations of the mobile device operation until confirmation is received from Central Controller 109 that the information has been received by Central Controller 109.

Figure 3:
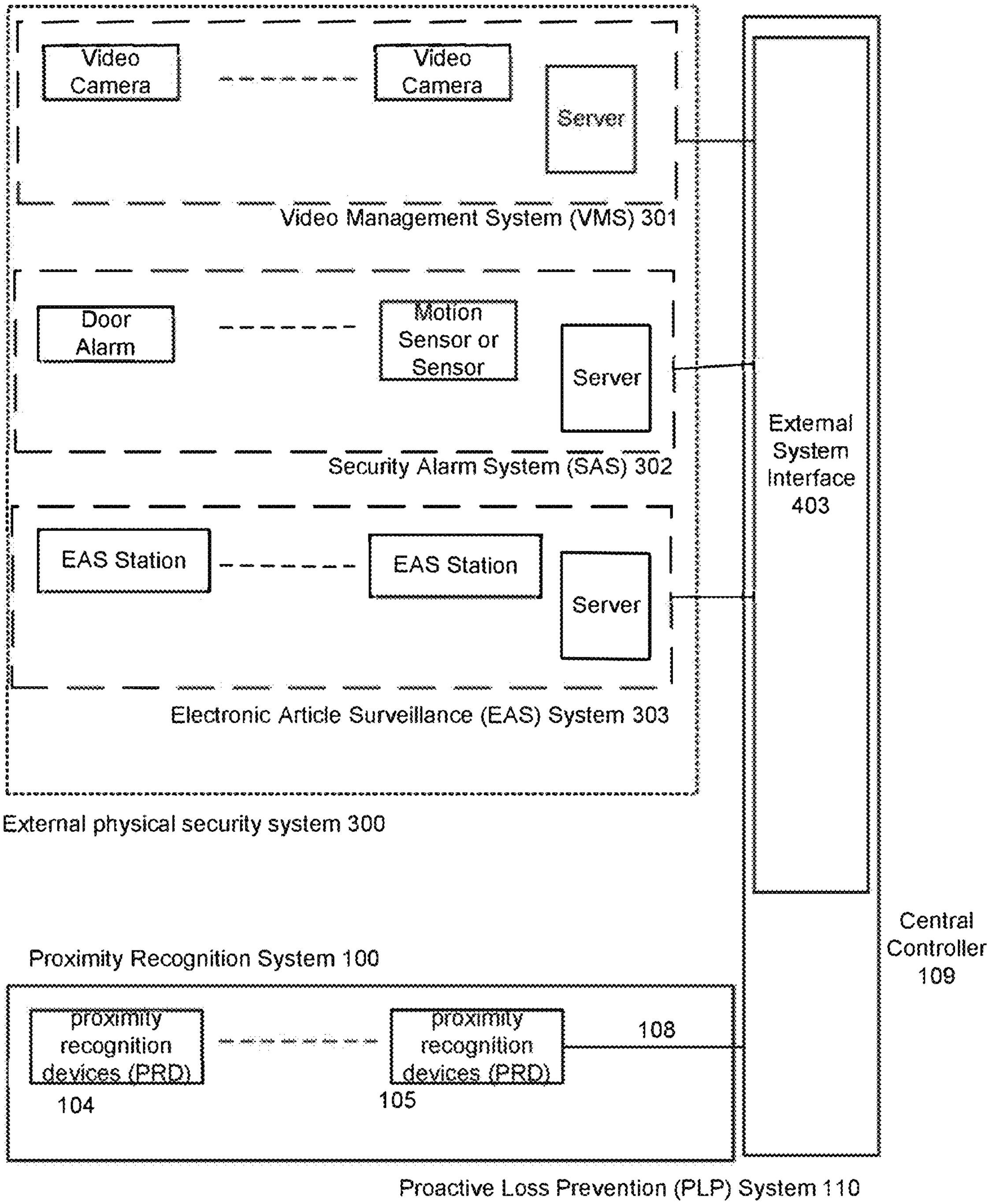
FIG. 3 illustrates sample external physical security systems in a typical deployment environment.

FIG. 3 presents a sample External physical security system 300 in a typical deployment environment. PLP System 110 interfaces with different physical security systems (Systems 301, 302, and 303) via External System Interface ESI 403. System 301 is a Video Management System (VMS) that comprises multiple video cameras and some computing resources for the video management functions (centralized or distributed). VMS 301 can provide to PLP, either user-actuated notice (corresponding to user reviewing images and determining that an Incident occurred) or automatic notice (e.g. indicative of VMS inferring that certain captured images are those indicative of an Incident). System 302 is a security alarm system (SAS) that comprises multiple alarm sensors (e.g. door, window, motion sensor, and the like) and some computing resources for alarm management functions. System 303 is an Electronic Article Surveillance (EAS) system that comprises multiple surveillance subsystems and some computing resources for article surveillance management functions. Typical EAS systems include magnetically tagged articles and exit gates that detect the movement of an article thereto that has not been demagnetized and notify accordingly (with time of detection and gate location in the venue).

The present invention sees each of these external systems as a "black box" as it only interfaces with any external system via a defined system interface (e.g. Web service, JSON).

PLP System 110 has a proximity recognition system PRS 100 which includes multiple proximity recognition devices PRDs 104,105. and other computing resources for the proximity recognition management, event management, and wireless device watch system functions.

The invention augments existing external physical security systems (such as that shown as External System 300). However, it can also operate based on the functions provided by a Proactive Loss Prevention PLP System 110 only.

Figure 4:
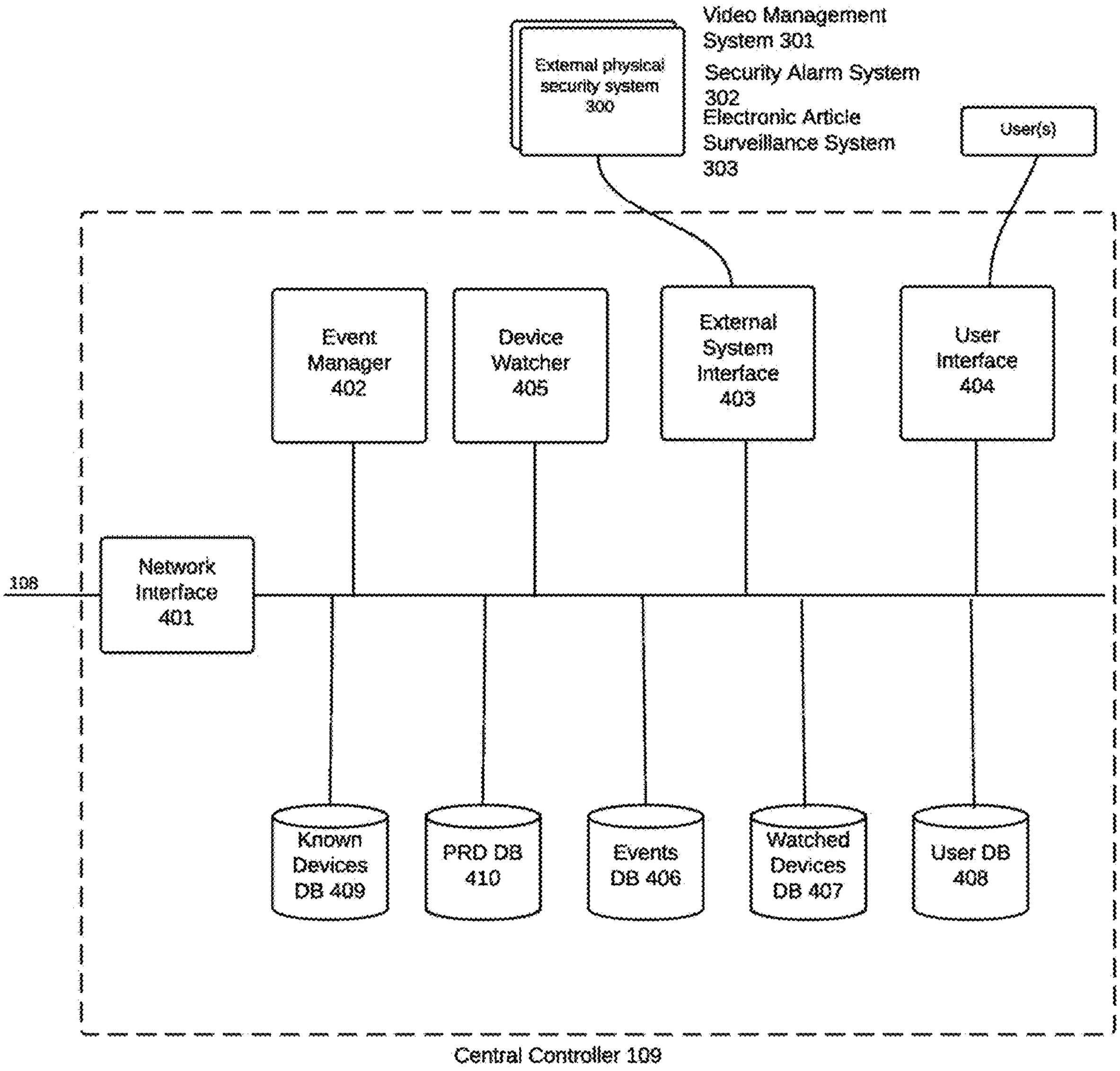
FIG. 4 is a functional block diagram of Proactive Loss Prevention (PLP) System.

To illustrate the event management and wireless device watch system of PLP System 110 in more detail, a functional block diagram of Central Controller 109 is presented in FIG. 4. The principal modules used to implement the present invention are in Central Controller 109 and includes Network Interface 401, Event Manager 402, External System Interface ESI 403, User Interface 404, Device Watcher 405, and various databases for storage of events (Events DB 406, Devices Watched DB 407, Users information 408, Known Devices DB 409, PRDs DB 410.

Central Controller 109 uses Network Interface 401 to communicate with PRDs 104, 105 in a manner well known to those skilled in the area of information systems and communications technology.

Event Manager 402 responds to External Systems 300 incident notifications by creating events that are acted upon as explained. An Event can either be created by a user or initiated by an Incident notification from External System 300 via External System Interface ESI 403. A typical Event is defined as a short specific time period with other system parameters (e.g. PRD(s) 104, 105 selection (by user or predefined), granularity selection). Based on this Event, Event Manager 402 can establish a list of the Known Devices that matches that Event definition from reviewing the venue appearance history for the selected PRD(s) 104, 105. For a specific Event Set (of one or more Events), Event Manager 402 can then determine the Suspect Device(s) based on the intersection of the known devices from the specific Event Set. Once a Suspect Device is identified, Event Manager 402 can use it for historical reporting purpose (e.g. historical activities of this device) and/or pass this information to other system modules for further actions (e.g. Device Watcher 405 adds the Suspect Device to the Devices Watched DB 407).

External System Interface ESI 403 processes requests and responses from/to various External Systems 300. For example, an Incident notification from Video Management System VMS 301, may trigger External System Interface ESI 403 to request video images based on a specific time period before storing the Event information in the Events DB 406.

User Interface 404 provides input and output functionality for the PLP System user (typically the user or its proxy. Typical input is for user to manage (e.g. create, delete, change) the event set; and typical output is to provide various event reports and/or alerts. Various user function and access control are also provided via User Interface 404 with storage in User DB 408.

Device Watcher 405 processes Known Device protocol data unit (POU) from PRO 104 via Network Interface 401. Based on a defined rule, Device Watcher 405 performs specific actions with support from another system module (e.g. for customer A: alert email via User Interface 404 to security personnel, for customer B: alert External System's VMS 301). Device Watcher 405 stores its data in the Known Devices DB 409, PRO DB 410, and Devices Watched DB 407.

It should be appreciated that the present invention can be implemented in numerous ways, including as a process, a system, an apparatus, a device, a method, a computer readable storage medium containing computer program code, or as a computer program product comprising a computer usable medium having a computer readable program code embodied therein.

In one embodiment, modules in Central Controller 109 reside on a single computer platform. Alternatively, Central Controller 109 can be implemented on a distributed computer environment.

Figure 5:
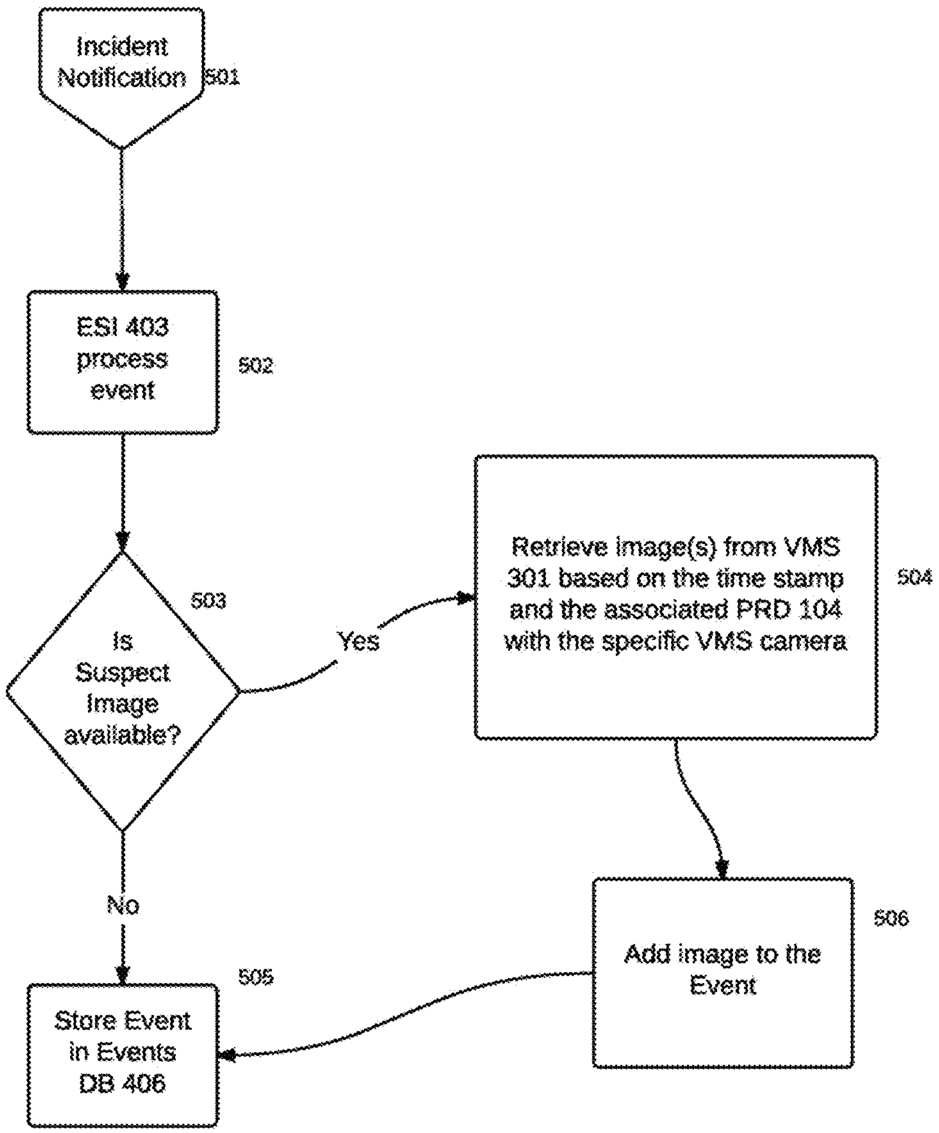
FIG. 5 is a logic diagram illustrating the processing of an external incident notification from an external system for which images are available.

FIG. 5 presents a flowchart describing the steps performed by External System Interface ESI 403 to process an Incident notification where images may be available for retrievable. Incident Notification is received (step 501). ESI 403 processes Incident Notification, and with Event Manager 402, creates an Event corresponding to, and associated with, the Incident (step 502). An image relevant to the Event is sought from a source of images (such as VMS 301) and if there is one that corresponds to the time and location of the notified Incident and corresponding Event, then retrieve and add it to Event and record Event in Events DB 406 (steps 503, 504, 506 and 505).
Otherwise, simply record Event in Events DB 406 (steps 503 and 505).

Figure 6:
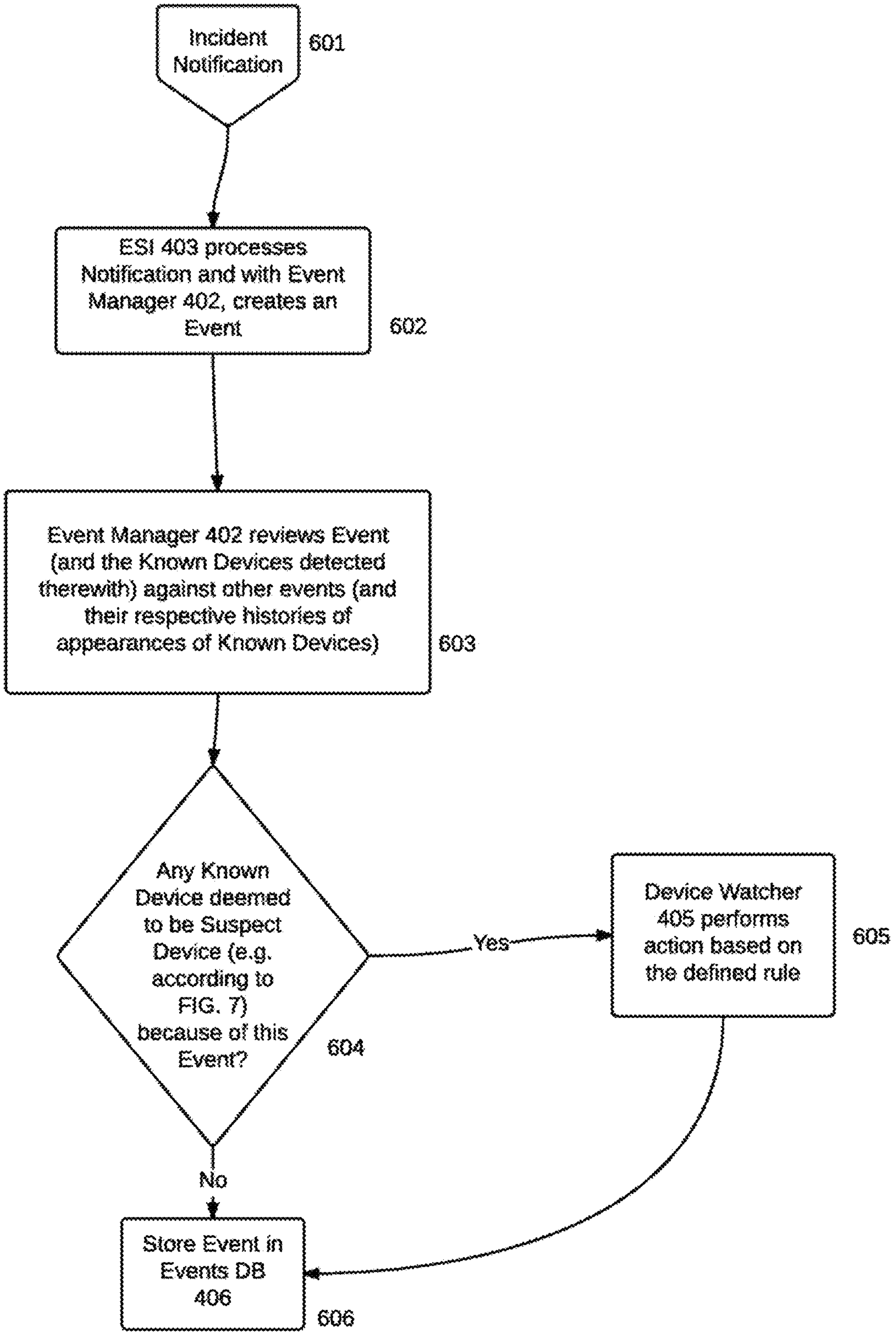
FIG. 6 is a logic diagram illustrating the process of an external incident notification from an external system.

FIG. 6 flowchart shows the steps performed by External System Interface ESI1 403 to process an Incident notification.

An Incident Notification from an External System (step 601) is processed by ESI 403 in conjunction with Event Manager 402. The result is the creation of an Event corresponding to and associated with the Incident (step 602). Event Manager 402 reviews this Event (and the Known Devices detected therewith) against other events (and their respective histories of appearances of Known Devices). More meaningfully particular, it reviews against those segments of history that had "suspicious activities" (or, according to this invention, that had notified Incidents and corresponding Events) which had aspects in common with this Event—e.g. another event shares the Event's PRD(s) (i.e. physical proximity) and/or shares the Event's time period (i.e. temporal proximity). The Known Devices that were (physically and temporally) proximate an
Incident (i.e. those that were detected by the Event's designated PRD(s)) are compared with the venue appearance histories of other mobile devices for other events (step 603). As a practical matter, only a subset of the complete history of the mobile devices in and near the venue is considered. This subset is implemented by considering a (user defined or predefined rule) Event Set (see exemplary FIGS. 7 and 9) that is a plurality of events, including the Event, to determine if any Known Devices were present in all the "events" of the Event Set). Every such Known Device that is deemed a Suspect Device (according to an exemplary process show in FIG. 7) will be responded to by appropriate action by Device Watcher 405; and the Event is recorded in Events DB (steps 604, 605, 606). If the review results in no Known Device being deemed a Suspect Device, then the Event is simply stored in Events DB 406 (steps 604, 606).

In the simplest case (not shown), the Event Set consists only of one Event, so the (single) Incident is associated with and normalized to, and corresponds to, the (single) Event (time+PRD(s)) and is deemed to be a Suspect Device.

Figure 7:
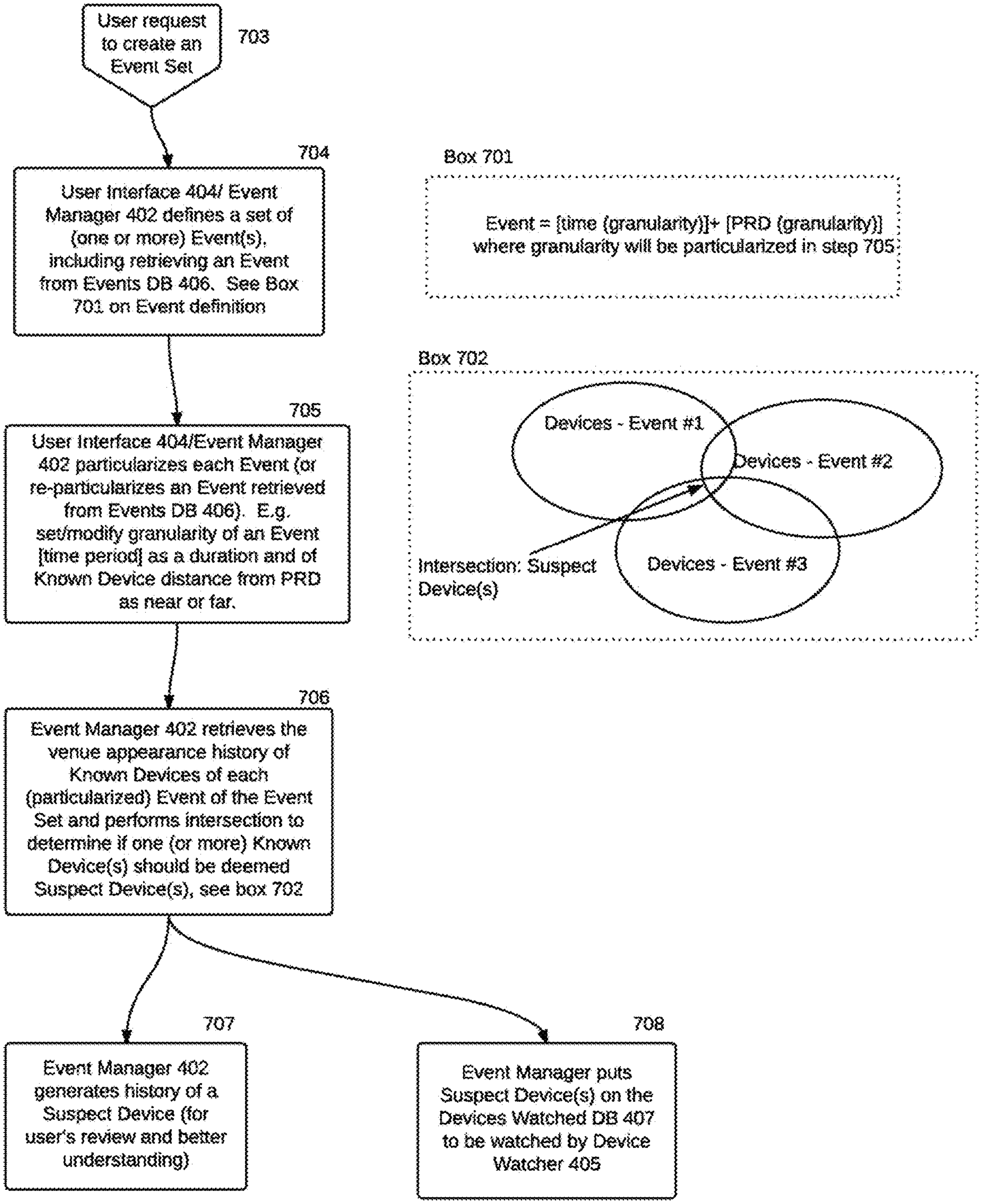
FIG. 7 is a logic diagram illustrating the process of an Event Set creation by a user.

FIG. 7 presents a flowchart describing how User Interface 404 and Event Manager 402 process a user request to define a set of events (Event Set) and the subsequent actions.

User requests to create an Event Set (step 703). The user, with User interface 404 and Event Manager 402, defines a set of (one or more) Event(s) to be an Event Set (step 704 and box 701).

User (step 704), with User Interface 404 and Event Manager 402, defines or creates an Event which takes the form of (Box 701):

$$\text{Event}=[\text{time(granularity)}+[\text{PRD}(i)(\text{granularity}(i))]$$

This Event (in step 704) is either generated completely by user or by user retrieving a (prior recorded) Event from Events DB 406 and re-using it.

The "time" of an Event is defined by (and populated with) the time of the notified Incident. The PRD(s) of an Event is defined by the user, whether when user is interested to define an Event or earlier, having been pre-defined by user (an association between a particular Incident and PRD(s) is pre-defined earlier by user). For example, a particular station of EAS 303 is located in a particular location in the venue, and it is associated with PRDs 1 and 7 because of the physical relationship/proximity of that EAS station relative to those PRDs. When that EAS station is triggered, all Known Devices detected by those PRDs can be known to provide the inference that the individual who triggered the EAS station, was carrying one of those detected Known Devices. Similarly, a mapping is made of SAS 302, sensor-triggerable stations with proximate PRD(s). In the case of VMS 301, it is the VMS sensor/camera's field of image capture that is mapped to certain PRDs as within their detection proximity ranges.

Regardless of how the Event is initially defined, the granularities of time and proximity to PRD(s) are set or re-parameterized by user (step 705). Re-granularization enhances the ability to find non-null intersections of Events, i.e. to find and reasonably deem a Known Devices as a Suspect Device.

Event Manger 402 generates the history of a Suspect Device for the user's review and better understanding (step 707) and puts the Suspect Device(s) into the Devices Watched DB 407 to be continuously watched by Device Watcher 405 in case of return to the venue (step 708).

For examples: In Step 704, the Notified Incident=[December 31 at 10 pm][trigger of EAS gate #8]; and this is normalized to the (initial) Event: [December 31 at 10 pm][PRO #10 and PRO #7]. In Step 705, this (initial) Event is granularized (or re-granularized) by user as: Event=[December 31 at 10 pm+/−30 minutes][PRD #10/near and #PRO 7/far]

Examples of Event Sets:

Event 1=proximity of Known Device to PRO #1 at time 1+/−30 minutes Event 2=proximity of Known Device to PRO #1 at time 2+/−60 minutes
where two or more Events are for the same PRO but at different or overlapping occurrence times (periods); and the intersection of these two Events is (deemed to be) Suspect Device(s).

Event 1=proximity of Known Device to PRO #1 at time 1+/−30 minutes Event 2=proximity of Known Device to PRO #2 at time 2+/−60 minutes where two or more Events are for different PRDs but at different or overlapping occurrence times (periods); and the intersection of these two Events is (deemed to be) Suspect Device(s).

Event Manager 402 (step 706 and box 702) checks the venue appearance history of each (granularized or re-granularized) Event, for Known Devices that match that Event, and then performs an intersection—any non-null result (of one or more Known Devices) deems such Known Device(s) as Suspect Device(s) (step 706).

For example. An Incident may be impermissible movement of a retail article that has not been paid for and demagnetized by the venue cashier, on December 31 at 5 PM, and travelled through the venue's western electronic article surveillance gate that has a particular physical distance from a plurality of PRDs at known locations in the venue. The Event corresponding to that Incident might be (as selected by user): [December 31, 4:30 PM to 5:00 PM]+PRO #?)/close and PRO #8)/far. The venue appearance history for such Event would be the list of Known Devices that visited on December 31, 4:30 PM to 5:00 PM in close proximity to PRO #7 and far from PRO #8.

User may then define/select and (re)granularize another Event (corresponding to another notified Incident or a notional Incident developed by user) and obtain its venue appearance history. Then user performs an intersection of those two venue appearance histories and their respect lists of Known Devices. The Known Device(s) present, if any in both lists, would be deemed to be Suspect Devices.

An aspect of an Event's granularity (and specifically, the granularity of its PRD(s)), could be: "near", meaning that only the detections by a PRO of a Known Device whose received signal strength exceeds a relatively high threshold level, are counted in the venue appearance history of that PRO for that Known Device; and where "far" means the threshold level of received signal strength is set low relative to the level for "near". By adjusting the granularity of a PRO, the user may adjust the size of the "net" of capture of Known Devices that are candidates for being deemed Suspect Devices.

Although the examples given are of simple operators such as intersection, other operators are possible and desirable for some purposes. For example, fuzzy logic may be applied to a plurality of Events to better identify Suspect Devices.

As a variation, the deeming of a Known Device detected in "suspicious circumstances", as a Suspect Device, is not automatically accomplished but requires evaluation of additional information about that particular Known Device. For example, other information (from the subject venue or from another venue or any other source) about that Known Device is retrieved and the cumulative effect may be (or not) sufficient to deem a Known Device as a Suspect Device. It may be that information from other venues indicates that this Known Device (and by inference, its holder) has triggered other electronic surveillance systems and has been involved in multiple suspicious activities at other times and/or other venues. If the cumulative information about this Known Device is not enough (by user-defined criteria), this Known Device is tagged and recorded accordingly (for future reference) but is not yet deemed as a Suspect Device.

Figure 8:
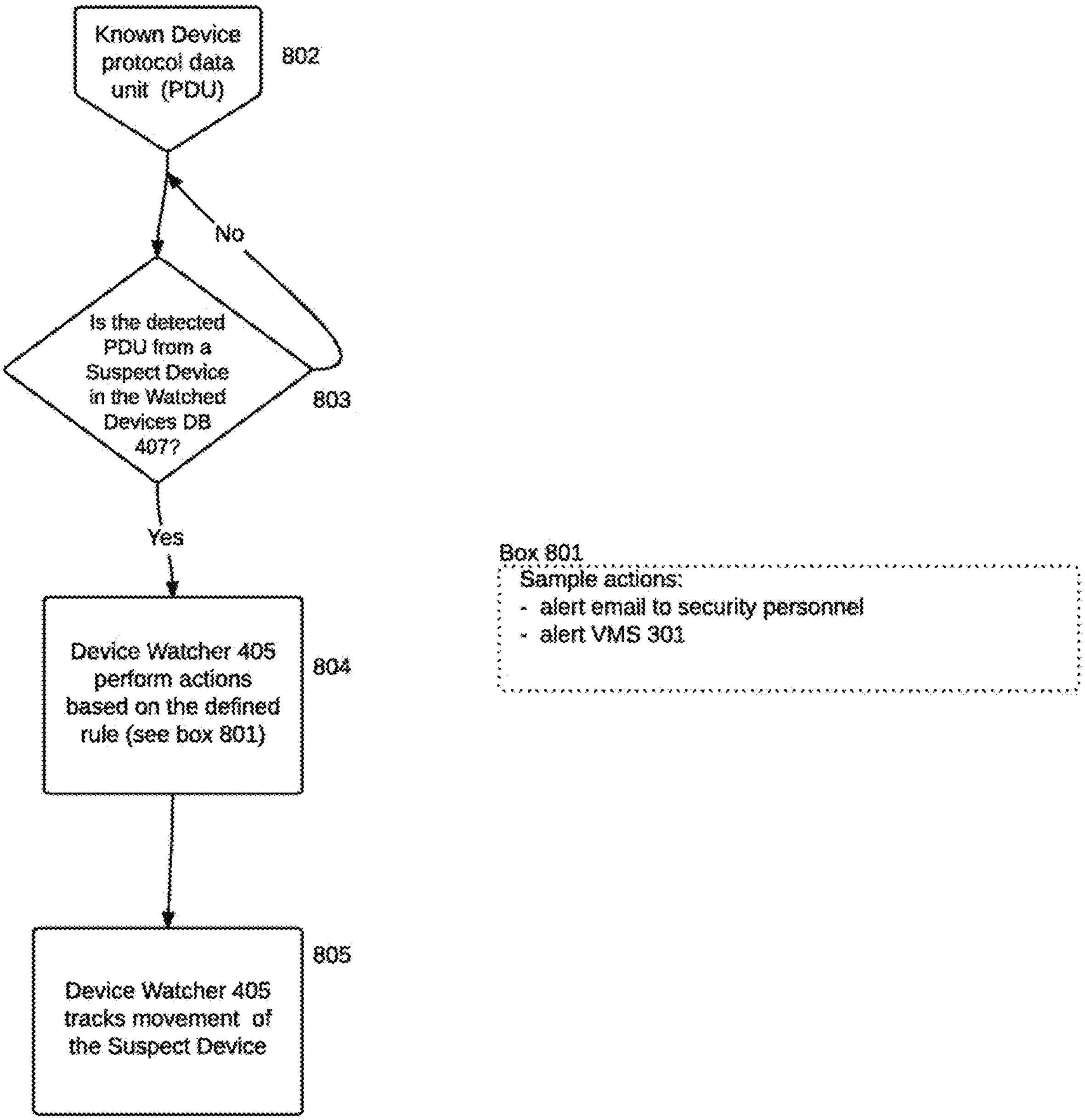
FIG. 8 is a logic diagram illustrating the processing of a Known Device Protocol data unit (POU)

FIG. 8 presents a flowchart describing Device Watcher 405 processes device protocol data units (PDUs) from PRO 104.

After PLP system 110 has detected a protocol data unit (POU) to be from a Known Device (step 802), determine if the detected POU is from a Suspect Device (step 803). If it is, then take defined rule-based remedial actions (step 804). Examplary actions include: alert email to security personnel and alert VMS 301 (box 801) while continuing to track the movement of the Suspected Device in and near the venue (whether by all PRDs in the venue or selected PRD(s)) (step 805). VMS 301 is equipped (with or without human user guidance) to better focus on the physical area of the Incident (and corresponding Event). Accordingly, the Event that corresponds to the Incident of reappearance of Suspect Device, is interpreted as instructions to VMS 301 to retrieve images of interest/relevance, and these instructions are alerted to VMS 301.

Figure 9:
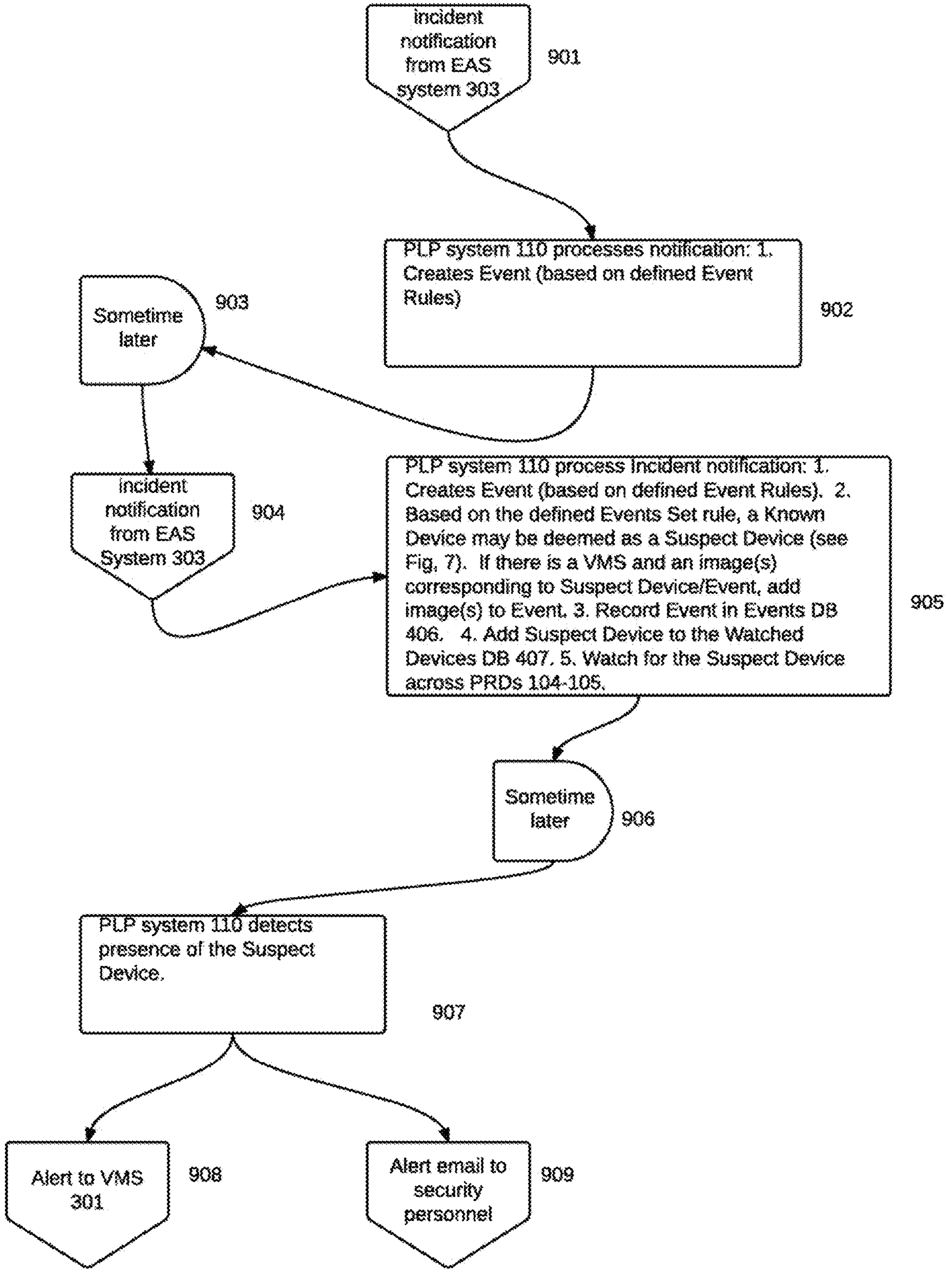
FIG. 9 illustrates a system deployment sample in a retail venue with interaction of an Electronic Article Surveillance System (EAS) and Video Management System (VMS)

FIG. 9 presents a system deployment sample in a retail setting with interaction of EAS System 303.

FIG. 9 shows an examplary implementation of PLP System 110. Video management system VMS 301, EAS System 303, and PLP System 110 can reside on physical computing equipment resident in the venue or elsewhere. One or more EAS stations are deployed in or around the venue and are connected to EAS System 303. One or more cameras are deployed in or around the venue and are connected to VMS 301. One or more wireless based PRDs 104, 105 are deployed in and around the venue as part of PRS 100. After Incident notification from EAS System 303 then PLP System 110 and VMS 301 may interact to select and retrieve one or more images that may be of future use to security personnel when the Suspect Device (carried by a person) re-enters the venue (or enters another related venue of interest to user). Security personnel are notified accordingly. Although described with an exemplary EAS system 303, the same process is applicable to an Incident notification from SAS system 302 or VMS system 301—i.e. any External System 300 that automatically notifies of an Incident.

PLP system 110 receives Incident notification from EAS system 303 (step 901). PLP System 110 processes the Incident notification by creating or defining an Event (see FIG. 7 and associated explanations) (step 902). Time passes (step 903). PLP system 110 receives another Incident notification from EAS system 303 (step 904).
PLP System 110 processes the Incident notification by defining another Event. Based on defined Event Set rule, a Known Device may be deemed a Suspect Device (according to FIG. 7). If there is a video management system VMS and if an image is available related to the Incident/Event, then retrieve the image and add it to the Event and record the Event in the Events DB 406. Add the Suspect Device to Devices Watched DB 407 to be continuously watched by Device Watcher 405 across or near the venue. Step 905. Time passes (step 906). If PLP system 110 detects appearance (i.e. return) of the Suspect Device (by specified PRDs) or across and near the venue), then exemplary remedial actions include: alert VMS 301 to find and retrieve relevant images (step 908) and alert email to venue security personnel (step 909). VMS 301 may (with or without user guidance), focus its cameras on the Event's location/PRD(s).

Figure 10:
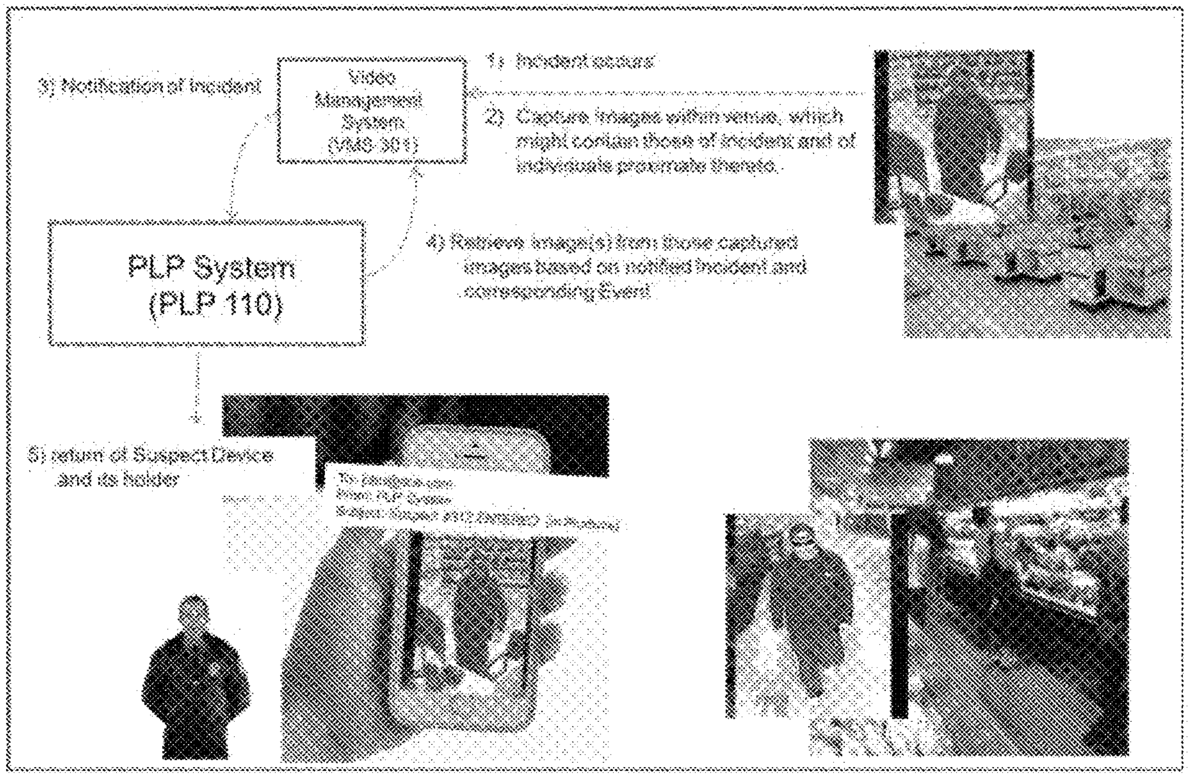
FIG. 10 illustrates a system deployment sample in a retail venue with interaction of a VMS.
Figure 11:
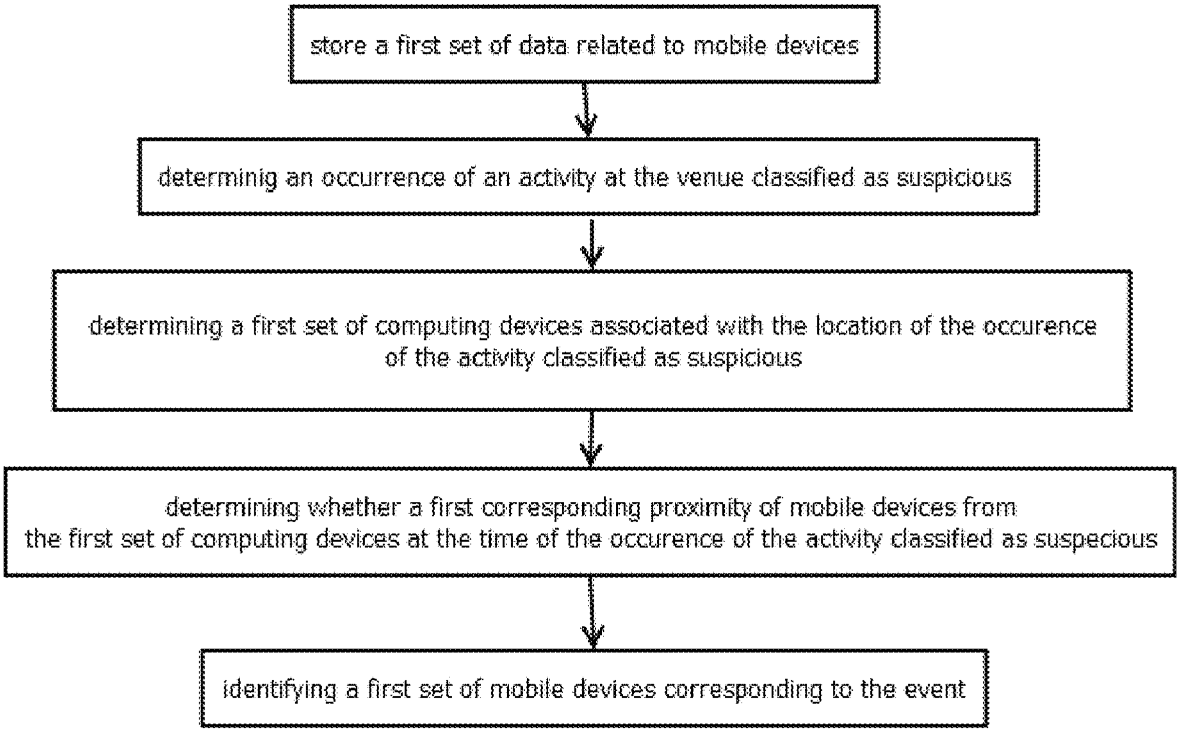
FIG. 11 is a flowchart showing a process.

FIG. 10 presents a system deployment sample in a retail setting with interaction of a VMS.

FIG. 10 illustrates a possible implementation of the Proactive Loss Prevention System (PLP) System 110 with a video management system (whether connected or not to PLP 110). Both can reside on physical computing equipment resident in, or remote from, the venue. One or more cameras are deployed in or near the venue as part of video management system. One or more wireless based PRDs 104, 105 are deployed in and near the venue. Upon recognition of a Known Device as a Suspect Device, PLP System 110 and VMS 301 may interact to select and retrieve one or more images that were captured proximate (physically and temporarily) the Incident (of return of Suspect Device to venue, and its corresponding Event) that may be of future use to security personnel (e.g. when a Suspect Device re-enters the venue or enters a related venue of interest to the user, security personnel are accordingly notified of such image (s)).

In step 1, certain activity in the venue is considered suspicious, and thereby, an Incident is considered to have occurred. The consideration could be: automatic operation of External System 300 (as explained above in connection with FIGS. 3-6 and 9) or by the user reviewing video tape or other captured images independently of PLP System 110. Either way, an Incident is parameterized by time and location of occurrence.

In step 2 (which is a continuing process), capture images in and near venue, which might contain those of Incident of step 1 and of individuals proximate thereto. The images may be captured by VMS 301 or a similar but independent video or camera system.

In step 3, the Incident is notified to PLP System 110.

In step 4, PLP System 110 requests to retrieve relevant image(s) (from the venue image capture system based on notified Incident and corresponding Event.

In step 5, user is alerted to the return of the Suspect Device and to the image(s) of the person(s) proximate the Suspect Device, according to step 4.

Although VMS 301 has been described above, another similar video system (unconnected to PLP 110) can be used as an implementation variation. The present invention teaches that the voluminous amount of images, such as captured by any video system, is easily filtered to a few pertinent ones (related to suspicious activities) if the relevant time and relevant PRDs are identified (and translated back to a particular time and particular video camera(s)). Accordingly, while this invention has been described with reference to the illustrative embodiments, this description is not intended to be construed in any limiting sense. Various modifications of the illustrative embodiments, as well as other embodiments of the invention, will be apparent to persons skilled in the art upon reference to this description. It is therefore contemplated that any future patent claims will cover any such modifications or embodiments which falls within the scope of the invention. In particular, whether or not the venue has WLAN infrastructure or not, and regardless of how the data on the recognition of visiting WLAN enabled devices was obtained, the principles of this invention are applicable.

What this invention teaches is that it is important to consider what to do post-data acquisition—to analyze the data for patterns (of presence of devices) that are rich for inferences to be made about the visitors and their devices, and how the data and inferences are used for proactively reducing loss.

The invention claimed is:

1. A method comprising:

detecting, with a computer system, one or more mobile devices at a venue;

storing, with the computer system, a set of data, the set of data including a location of detection at the venue of the one or more mobile devices, a unique identifier of the one or more mobile devices, a time of detection at the venue of the one or more mobile devices, an identifier of a corresponding computing device at the venue that detects the one or more mobile devices, and corresponding distance of the one or more mobile devices from the corresponding computing device that detects the one or more mobile devices;

determining, with the computer system, an occurrence of an incident at the venue and a time and location of the occurrence of the incident;

determining, with the computer system and from the set of data, a first set of mobile devices proximate to the occurrence of the incident based on distance from the one or more mobile devices from a first set of computing devices that detect corresponding mobile devices of the one or more mobile devices and a distance threshold;

identifying, with the computer system, at least one suspect device among the first set of mobile devices;

correlating, with the computer system, visual or image data captured at the venue with detections of the at least one suspect device to identify a suspect corresponding to the at least one suspect device; and detecting a return of the at least one suspect device and alerting a venue operator of the return of the suspect and providing an image of the suspect to the venue operator.

2. The method of claim 1, wherein the first set of computing devices are proximity recognition devices, and wherein the identifying the at least one suspect device among the first set of mobile devices comprises:

determining, with the computer system, a second set of proximity recognition devices associated with a location of a second occurrence of the incident;

determining, with the computer system, whether a second corresponding distance of the one or more mobile devices from the second set of proximity recognition devices at the time of the second occurrence of the incident is less than a second distance threshold based on the set of data;

identifying, with the computer system, a second set of the one or more mobile devices corresponding to the second occurrence of the incident, wherein the second corresponding distance of the second set of the one or more mobile devices from the second set of proximity recognition devices at the time of the occurrence of the incident is less than the second distance threshold;

identifying, with the computer system an intersection of the first set and the second set; and determining, with the computer system, at least one mobile device in the intersection to be the at least one suspect device.

3. The method of claim 1, further comprising:

performing a remedial measure when a mobile device is determined to be the at least one suspect device, wherein the remedial measure is user defined.

4. The method of claim 3, wherein the remedial measure is an alert to an operator of the venue or a security personnel associated with the venue.

5. The method of claim 1, further comprising:

identifying a person associated with the at least one suspect device; and obtaining additional information about the person.

6. The method of claim 1, wherein the occurrence of the incident includes a re-appearance of the at least one suspect device at the venue.

7. The method of claim 1, wherein the occurrence of the incident at the venue is determined based on a user review of a video record of activities at the venue and a user classification of at least some of the activities in the video record as being the incident.

8. The method of claim 1, wherein determining, from the set of data, the first set of mobile devices proximate to the occurrence of the incident includes determining whether the corresponding distance of the one or more mobile devices from the first set of computing devices during a first period of time is less than the distance threshold, wherein the first period of time includes the time of the occurrence of the incident.

9. The method of claim 1, wherein determining of the occurrence of the incident is performed automatically by a sensing system.

10. The method of claim 9, wherein the sensing system includes motion or image sensors to determine the occurrence of the incident.

11. The method of claim 1, wherein the occurrence of the incident is determined by an Electronic Article Surveillance (EAS) system, a Security Alarm System (SAS), or a Video Management System (VMS).

12. The method of claim 11, wherein the EAS system includes a sensor that detects a movement of an article from the venue, wherein the incident includes information regarding an association of the EAS sensor with the first set of computing devices, and wherein determining the occurrence of the incident includes determining the movement of the article as the occurrence of the incident.

13. The method of claim 11, wherein the SAS includes a sensor that detects a motion, wherein the incident includes information regarding an association of the SAS sensor with the first set of computing devices, and wherein determining the occurrence of the incident includes determining the motion detected by the sensor as the occurrence of the incident.

14. The method of claim 11, wherein the VMS includes a camera and wherein the incident includes information regarding an association of the camera and a field of vision of the camera with the first set of computing devices.

15. The method of claim 1, wherein at least one mobile device from the first set of mobile devices is determined to be the at least one suspect device after obtaining and evaluating additional information regarding other types of activities of the at least one mobile device, and wherein the additional information relates to a detection of the at least one mobile device proximate to the incident in another venue or at an earlier time.

16. The method of claim 1, comprising:
steps for processing of an external incident notification from an external system.

17. The method of claim 1, wherein the occurrence of the incident is determined by a non-real-time user evaluation or in real-time by a rule-based computer system evaluating a sensor input.

18. The method of claim 1, wherein:
the incident is performed by a person at the venue having at least some of the one or more mobile devices and appearing in video footage depicting at least part of the venue.

19. A tangible, non-transitory, machine-readable medium storing instructions that when executed by one or more processors effectuate operations comprising:
detecting, with a computer system, one or more mobile devices at a venue;
storing, with the computer system, a set of data, the set of data including a location of detection at the venue of the one or more mobile devices, a unique identifier of the one or more mobile devices, a time of detection at the venue of the one or more mobile devices, an identifier of a corresponding computing device at the venue that detects the one or more mobile devices, and corresponding distance of the one or more mobile devices from the corresponding computing device that detects the one or more mobile devices;
determining, with the computer system, an occurrence of an incident at the venue and a time and location of the occurrence of the incident;
determining, with the computer system and from the set of data, a first set of mobile devices proximate to the occurrence of the incident based on distance from the one or more mobile devices from a first set of computing devices that detect corresponding mobile devices of the one or more mobile devices and a distance threshold;
identifying, with the computer system, at least one suspect device among the first set of mobile devices;
correlating, with the computer system, visual or image data captured at the venue with detections of the at least one suspect device to identify a suspect corresponding to the at least one suspect device; and
detecting a return of the at least one suspect device and alerting a venue operator of the return of the suspect and providing an image of the suspect to the venue operator.

* * * * *